United States Patent [19]

Long

[11] 4,231,037
[45] Oct. 28, 1980

[54] RADAR CLUTTER SUPPRESSOR

[76] Inventor: Maurice W. Long, 1036 Somerset Dr., NW., Atlanta, Ga. 30327

[21] Appl. No.: 880,624

[22] Filed: Feb. 23, 1978

Related U.S. Application Data

[63] Continuation-in-part of Ser. No. 797,197, May 16, 1977, abandoned.

[51] Int. Cl.² .............................................. G01S 13/00
[52] U.S. Cl. ............................... 343/5 CE; 343/5 VQ; 343/5 W; 343/7 A; 343/16 M; 343/17.1 R; 343/100 PE
[58] Field of Search ..................... 343/17.1 R, 100 PE, 343/7 A, 5 W, 16 M, 5 VQ, 5CE

[56] References Cited

U.S. PATENT DOCUMENTS

| | | | |
|---|---|---|---|
| 3,566,403 | 2/1971 | Hills | 343/5 R |
| 3,943,512 | 3/1976 | Dempsey | 343/16 M |
| 4,008,472 | 2/1977 | Nirasawa et al. | 343/17.1 R |

OTHER PUBLICATIONS

*Radar Reflecting of Land and Sea*, by Maurice W. Long, D.C. Heath and Co., Lexington, Mass., 1975.

*Primary Examiner*—Stephen C. Buczinski
*Attorney, Agent, or Firm*—Jones, Thomas & Askew

[57] ABSTRACT

This disclosure describes a radar clutter suppressor and target classifier that compares two or more video signals. Various signal conditioning and processing means are used for enhancing echo differences between targets and clutter caused by differences in polarization, carrier frequency, pulse length, antenna beamwidth, and antenna pointing direction. Signals are processed as if due to targets if the ratio of the video amplitudes are within a band of ratios and signals are suppressed as if due to clutter if the ratios are not within the band of ratios designated for targets. The invention includes methods for suppressing clutter caused by rain, land and sea.

37 Claims, 16 Drawing Figures

Fig_6

Fig_7

Fig_8

RADAR CLUTTER SUPPRESSOR

CROSS-REFERENCE TO RELATED APPLICATION

This disclosure is a continuation-in-part of U.S. Patent Application Ser. No. 797,197 filed May 16, 1977, now abandoned, a continuation of which is pending as Application Ser. No. 926,265, now abandoned.

BACKGROUND OF THE INVENTION

The amplitude characteristics of radar echoes depend on radar and geometric parameters as well as the physical characteristics of the objects from which the echoes emanate. In particular, the echo characteristics also depend on polarization, both that used for transmission and that used for reception.

The radar cross section $\sigma$ is a useful quantity for determining echo strength. This quantity is defined as $$\sigma = 4\pi R^2 (p^r/p^t)$$

where the power density at the target is $p^t$, the power density at the radar is $p^r$ and the distance from the target is R.

The terminology $\sigma_{AB}$ is used to denote radar cross section (RCS) for transmit polarization A and receive polarization B. For example, let the symbol x denote a linear polarization in any direction and let y denote a polarization perpendicular to x. In that case, $\sigma_{xy}$ denotes RCS for transmitting any linear polarization and receiving a linear polarization perpendicular to that transmitted. Because of reciprocity, $\sigma_{xy} = \sigma_{yx}$. It is noted here that received signal power, other factors being equal, is proportional to $\sigma$.

The reflecting properties of an object depend on various factors including surface shape, size, material, orientation, as well as the frequency and polarization of the radar signals. Object shape and orientation may cause waves to be reradiated with a polarization different from that incident on the object, i.e., $\sigma_{AB} \neq 0$. Such shapes are said to produce depolarization. Most large objects that have smooth surfaces, either metallic or dielectric, do not cause depolarization. Therefore, there are many targets of interest that cause less depolarization than is caused by most land an sea surfaces.

The concept of using the depolarization effects of clutter to discriminate between the clutter and a target has been discussed in several patents. Apparatus for differentiating between target echoes and clutter echoes based on transmitting a linearly polarized wave, and receiving that polarization and one perpendicular to that polarization has been described in U.S. Pat. No. 2,508,571 issued to E. L. Hudspeth; U.S. Pat. No. 3,566,403 issued to E. G. Hills; U.S. Pat. No. 3,849,780 issued to F. J. Dynan; and U.S. Pat. No. 3,918,059 issued to D. J. Adrian. Apparatus for differentiating between target echoes and clutter echoes on transmitting a circular polarized wave, and receiving both left-and right-circularly polarized echoes have been described in U.S. Pat. No. 3,403,397 issued to R. C. Harrington and G. R. Latham IV; U.S. Pat. No. 3,614,787 issued to G. E. Hart; and U.S. Pat. No. 3,755,810 issued to G. R. Latham and W. T. Allen.

As reported in the book *Radar Reflectivity of Land and Sea*, D. C. Heath and Company, Lexington, Mass., 1975, p. 338, by M. W. Long, there are troublesome target-like sea echoes, called sea spikes, that are only slightly depolarized; i.e., the echoes are almost entirely of one polarization. Therefore, the dual polarized radar systems described above are ineffective for suppressing such clutter.

There are two patents by T. Nirasawa and H. Ota that use various parameters, called discriminants herein, for reducing the effects of sea clutter. U.S. Pat. No. 3,893,117 contains claims using two pulse lengths and two beamwidths, and U.S. Pat. No. 4,008,472 contains claims using two polarizations and two carrier wavelengths. The embodiments provide means for comparing the video amplitudes for one value, called operative herein, of a discriminant with another value of the same discriminant. Nirasawa and Ota provide means for gating-off the receiver outputs when the ratio of video amplitudes is beyond a present value and for gating-off the receiver output when that ratio is between two preset values. A limitation of this prior art is that the ratios for clutter can have almost any value and can vary at rats as fast as 200 Hz or more for sea clutter. This means that clutter will often be present in each radar resolution cell used. It should be noted that there are fundamental differences between the gating means used by Nirasawa and Ota and those used in this disclosure for improved suppression of clutter, antenna sidelobes, and interference from external sources. Also, although there are one-antenna embodiments that use pulse length as the discriminant, all other embodiments included by Nirasawa and Ota require the use of two antennas. Further, the embodiments of Nirasawa and Ota limit the signal processing means to those using either the video output of one receiver, the other receiver, or the sum of the outputs of the two receivers.

It is noted that the prior art of Nirasaw and Ota provides for using wavelength as a discriminant without indicating a need to maintain a closeness of frequency so that two simultaneously received video signals will be equal or nearly equal for a target. Further, they use separate transmitters without means for maintaining a frequency difference and two antennas are used for carrier wavelengths $\lambda_1$ and $\lambda_2$. According to Nirasawa and Ota the antennas are identical in construction with each other except that they are designed for the carriers $\lambda_1$ and $\lambda_2$ respectively.

SUMMARY OF THE INVENTION

This application is a continuation-in-part of Patent Application Ser. No. 797,197, now abandoned, a continuation of which is pending as Application Ser. No. 926,265, now abandoned. That application covers means for enhancing target echo relative to clutter that compare signals resulting from the use of two or more polarizations and use various signal processing means. This disclosure also includes the use of different polarizations, but it also includes comparisons of echoes caused by differences in transmit carrier frequency, pulse length, antenna beamwidth, and antenna pointing direction. As is discussed in the section *Use of Other Discriminants*, there are useful polarization combinations possible when using two frequencies that were not previously disclosed. In addition, this continuation-in-part discusses the use of frequency agility with the various embodiments of Patent Application Ser. No. 797,197, now abandoned and with the embodiments disclosed herein.

The various embodiments of the present invention distinguish targets from clutter by using various discriminants. A discriminant is a radar parameter for which two "values", called operatives, of the parameter will give different received video signals. For example, received polarization and transmit carrier frequency are both discriminants. Operatives include specific polarizations, transmit carrier frequencies, transmit pulse lengths, antenna pointing directions, and antenna beamwidths.

Some of the novel features of the present invention include:

A. a comparator means for comparing a first received video signal with a second received video signal and for providing an output only when both video signals are of substantial magnitude and when the relative magnitude of the first received video signal to the magnitude of the second received video signal is a ratio within a predetermined range of ratios. It is noted that the prior art comparator of Nirasawa and Ota provides a radar signal output if one of the two received video signals is of substantial magnitude and the other received video signal is zero because gates in parallel are used. Consequently, the comparator means of the present disclosure provides for improved suppression of clutter, sidelobes, and interference from external sources.

B. An improved signal processing means that is responsive to the output of a comparator and is not otherwise responsive to a received video signal.

C. An improved clutter supressor means that simultaneously compares more than two received video signals.

D. Means requiring only one antenna for using polarization, frequency, and beamwidth as discriminants.

E. Means for using antenna beam pointing direction as a discriminant for obtaining improved clutter suppression.

F. The use of small carrier frequency differences as the discriminant for obtaining improved clutter suppression and target selectivity. Frequency differences used are typically 10 MHz or less so that the video signals when simultaneously received are decorrelated for clutter but are not decorrelated for targets of interest.

G. Transmission of circular polarization and simultaneous reception of two linear polarizations for the improved detectability of metal diplanes, thereby providing for the improved detectability of diplanar navigational buoys.

DETAILED DESCRIPTION

This is a continuation-in-part of Patent Application Ser. No. 797,197, now abandoned, a continuation of which is pending as Application Ser. No. 926,265. That disclosure describes a radar clutter suppressor and target classifier in which at least two signals of substantial magnitude, resulting from transmit-receive pairs having different combinations of polarizations, are received and a signal is generated based on the ratio of the amplitudes of the received signals. The present disclosure also includes signal processing means that use the differences in echoes for various polarizations, but it also includes means to use differences in echo caused by differences in transmitter carrier frequency, pulse length, antenna beamwidth, and beam pointing direction. Also common to the embodiments of both disclosures is the optional use of frequency agile transmitters and receivers. Although frequency agility, per se, is not basic to the various embodiments of this invention, the use of frequency differences as described in the section *Comparisons of Frequencies* is basic to embodiments described herein.

Figure 1:
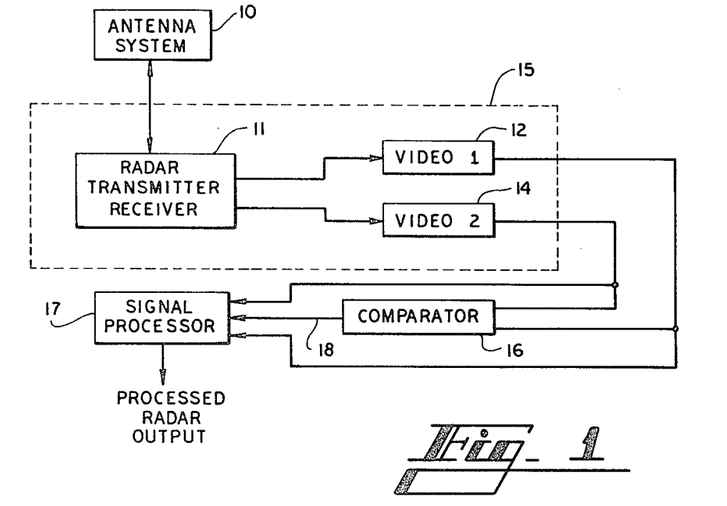
FIG. 1 is a block diagram of a preferred embodiment of the present invention.

FIG. 1 is a block diagram of a preferred embodiment of the invention. The antenna system 10 and the radar transmitter-receiver 11 are provided so that there are receiver video output signals responsive to different "values", called operatives, and of a discriminant. The discriminants are polarization, carrier frequency, pulse length, beam width, and antenna pointing direction. For example, video 1, shown as block 12, might be responsive to the operative transmit-receive polarization pair $P_1$ and video 2, shown as block 14, might be responsive to the operative transmit-receive polarization pair $P_2$.

The amplitudes of videos 1 and 2 are simultaneously compared in the comparaor 16 and on the basis of relative amplitude a gate signal 18 is obtained for further signal processing. In other words, a comparator output 18 is generated only if the ratio of the video 1 and video 2 amplitudes are within a predetermined range of ratios.

Figure 8:
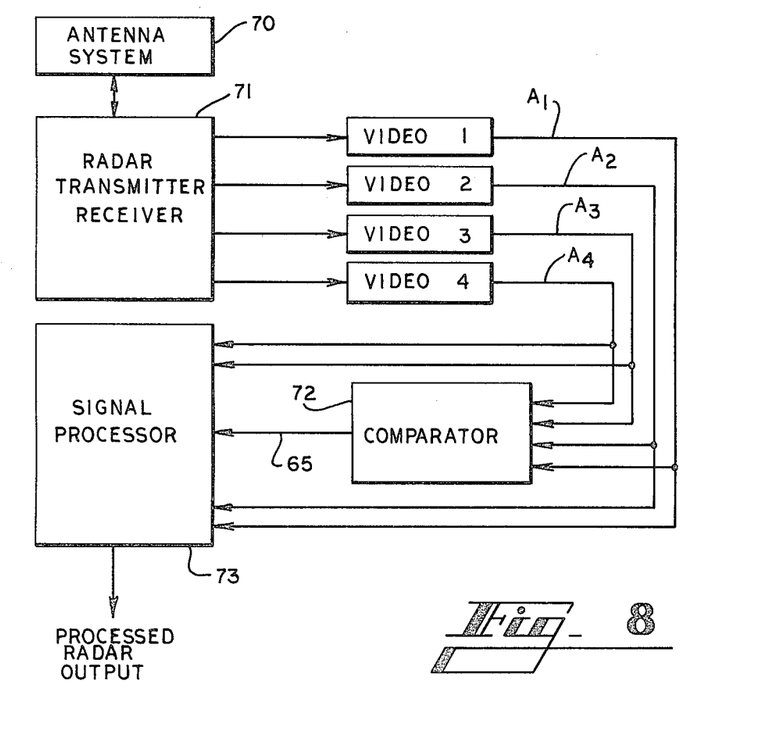
FIG. 8 is a block diagram of a preferred embodiment of the present invention that uses a comparator that is comprised of cascaded comparators.

By using at least three operatives, three or more video signals can be obtained for signal processing on the basis of ratios. FIG. 8 shows a preferred embodiment wherein the amplitudes of four received video signals are compared by a comparator 72. On the basis of various relative magnitudes, a comparator signal 65 is obtained for further signal processing.

The gate signals 18 and 65 may be used directly as radar outputs; they may be processed further and used as radar outputs; or they may be used in the processing of other signals.

COMPARISONS OF POLARIZATIONS

As already mentioned, the strength of radar echo from an object depends on both the transmit and receive polarizations. The terminology "polarization pair" is used to describe both polarizations. For example, transmit horizontal (H) and receive vertical (V), or HV for brevity, is a specific polarization pair. A first principle of this invention is that the ratio of echo strengths for two polarization pairs depends on the echoing object shape, size, orientation and material of which it consists.

Some of the polarization properties of targets are discussed in the previously referenced book *Radar Reflectivity of Land and Sea*, and special polarization characteristics that are helpful for understanding the principles underlying the present invention are given below. Let H, V, L, and R denote horizontal, vertical, left circular, and right circular polarizations. Because of reciprocity of the transmit and receive paths in air $\sigma_{HV}=\sigma_{VH}$, $\sigma_{RL}=\sigma_{LR}$, $\sigma_{HR}=\sigma_{RH}$, $\sigma_{VL}=\sigma_{LV}$, etc. It should also be clear that if H and V polarizations are transmitted simultaneously, received H and V signal strengths will, in general, depend on the relative phase of the two transmitted waves. However, if $\sigma_{HV}=\sigma_{VH}=0$ this relative phase does not affect the strengths of the H and V polarized echoes.

For brevity, the following abbreviations are used:
A>>B means A at least 10 times B
A≈B means A about the same as B
A≠B means A seldom equal to B.

There are many man-made targets for which the polarization characteristics are like that of a large, smooth metallic surface for which, typically $\sigma_{HH} \approx \sigma_{VV} >> \sigma_{VH}$
$\sigma_{RL} \approx \sigma_{HH} >> \sigma_{RR}$, $\sigma_{RR} \approx \sigma_{LL}$
$\sigma_{RH} \approx \sigma_{LH} \approx \sigma_{LV} \approx \sigma_{RV} \approx \sigma_{HH}/2$ Some natural surfaces can be characterized as large smooth dielectric surfaces. Sea swell is an example. Such surfaces cause little depolarization and $\sigma_{HH}$ is usually equal to or larger than $\sigma_{VV}$. For these surfaces $\sigma_{HH} >> \sigma_{HV}$, $\sigma_{VV} >> \sigma_{VH}$, $\sigma_{HH} \gtrsim \sigma$
$\sigma_{RH} > \sigma_{LH} \gtrsim \sigma_{RV} = \sigma_{LV}$
$\sigma_{RH} = \sigma_{HR} = \frac{1}{2}\sigma_{HH}$, $\sigma_{RV} = \sigma_{VR} = \frac{1}{2}\sigma_{VV}$ The polarization properties of rain can often be characterized by a cloud of spheres. For a sphere and for metal, 3-sided corner reflectors $\sigma_{HH} = \sigma_{VV}$, $\sigma_{HV} = 0$, $\sigma_{RL} = \sigma_{HH}$
$\sigma_{RR} = \sigma_{LL} = 0$
$\sigma_{RH} = \sigma_{RV} = \frac{1}{2}\sigma_{HH}$, $\sigma_{LH} = \sigma_{LV} = \sigma_{RH}$ The reflectivity properties of metal diplanes (2-sided corners used on navigational buoys) follow:

$\sigma_{HH} = \sigma_{VV}$, $\sigma_{VH} \neq 0$, $\sigma_{VH} \neq \sigma_{HH}$
$\sigma_{EH} \neq \sigma_{EV}$ if E represents arbitrary polarizations for which the H and V components are equal.
$\sigma_{RR} = \sigma_{LL}$, $\sigma_{RL} = 0$
$\sigma_{RH} = \sigma_{RV} = \sigma_{LV} = \sigma_{LH} = \sigma_{RR}/2$ The diplane seam orientation affects $\sigma$ for some polarizations even when it is in a plane perpendicular to the radar line-of-sight. Then $\sigma_{HH}$, $\sigma_{VV}$, $\sigma_{EH}$, $\sigma_{EV}$ depend on orientation, but $\sigma_{RH}$, $\sigma_{RV}$, $\sigma_{LH}$, $\sigma_{LV}$ are independent of orientation.

Some aircraft have polarization characteristics like large, smooth, metallic surfaces plus metal diplanes, as follows:

$\sigma_{HH} \approx \sigma_{VV} >> \sigma_{VH}$
$\sigma_{RL} \approx \sigma_{RR}$.

Extended areas of land and sea usually behave as a mixture of randomly oriented infinitesimal dipoles and smooth non-metallic surfaces, as follows:

$\sigma_{HH} \neq \sigma_{VV} \neq \sigma_{VH}$, $\sigma_{HH} \neq 0$, $\sigma_{VV} \neq 0$, $\sigma_{VH} \neq 0$
$\sigma_{RL} \neq \sigma_{RR} \neq \sigma_{LL}$, $\sigma_{RL} \neq 0$, $\sigma_{RR} \neq 0$, $\sigma_{LL} \neq 0$
$\sigma_{RH} \neq \sigma_{RV}$, $\sigma_{RH} \neq 0$, $\sigma_{RV} \neq 0$
$\sigma_{LH} \neq \sigma_{LV}$, $\sigma_{LH} \neq 0$, $\sigma_{LV} \neq 0$ The notation above, e.g. $\sigma_{HH} \neq \sigma_{VV}$, indicates that the various radar cross sections for clutter are seldom equal. In other words, for the example cited the amplitude of HH echo is seldom equal to that the VV echo. Both of these amplitudes generally fluctuate for targets and for clutter. However, the ratio of these amplitudes varies more widely and more rapidly for clutter than it does for man-made targets.

As already noted, the range of amplitudes for a clutter signal is large. Also, the echo for one polarization usually fluctuates independently of that for another polarization. Thus from each radar resolution cell the ratio of amplitudes of the two video signals will vary from essentially zero to very large values. Clutter echo varies rapidly because it is the composite result of summing echoes from many individual scatterers with phases that are sensitive to the relative positions of the scatterers. Fluctuation rates are usually represented by a continuum of frequencies with a half-power bandwidth that depends on transmitter wavelength. For example, this bandwidth for the sea is typically 50 to 100 Hz for a 3 centimeter wavelength.

Sometimes there are echoes that are exceptionally strong relative to the composite echo from the other scatterers. Such echoes can be caused by a dielectric surface that is smooth and large compared with the radar wavelength. For such a surface there is usually little depolarization of the echo and the echo amplitude for HH polarization will be equal to or exceed that for VV polarization. For example, sea spikes, which are discussed in the book *Radar Reflectivity of Land and Sea*, are a particularly troublesome type of clutter signal which have a number of target-like characteristics.

The ratio of the amplitudes of two signals is used as the basis for deciding whether or not to process echo signals as targets and thereby deciding on those to be rejected. This ratio can very rapidly for targets and for clutter, but the range of ratio values is normally much larger for clutter than for targets. The difference in the probability distribution of the ratio is basic to this invention. In other words, an enhancement of targets relative to clutter is accomplished through signal processing means by using differences in the frequencies of occurrence of echoes with various received polarization ratios. Further, by choosing certain bands of ratios to process, one can accomplish broad, general classifications for targets and clutter.

The present invention can be used for selecting between broad classes of man-made targets such as buildings, roadways, corner reflectors, and ships. It is also possible to provide for selectivity between broad classes of natural targets such as rain, bodies of water, and types of terrain, and features of the sea surface such as sea swell, white caps, wave fronts, wind slicks, and boundaries between currents. Therefore, the word "target" is used in this disclosure to include both natural and man-made phenomena.

When using polarization as a discriminant, a comparator is used that compares the amplitudes of two or more signals, each of substantial magnitude and resulting from different transmit-receive polarization pairs, to provide an output in response to a ratio of said characteristics to indicate the presence of a target echo. At least two different polarizations are used for the four signals required to provide first transmit, first receive, second transmit and second receive signals. The first and second relative signals provide at least two signal amplitudes of substantial magnitude. The comparator provides an output based on the relative magnitude of the two receive signals and this output is used for or with further signal processing. Thus, the invention uses selected polarizations to simultaneously provide from targets two video signals of substantial magnitude and compares these magnitudes. When the ratio of these magnitudes is within preselected ranges, a gate signal is generated to initiate the processing of signals as target signals.

FIG. 1 is a block diagram of a preferred embodiment of the invention. The antenna system 10 and the radar transmitter-receiver 11 are provided so that there are receiver video output signals responsive to target echo strength for at least two different polarizations. For example, video 1, shown as block 12, might be responsive to transmitting and receiving horizontal polarization and video 2, shown as block 14, might be responsive to transmitting and receiving vertical polarization. Of paramount importance is that the amplitudes of videos 1 and 2 are each of substantial magnitude and that each is responsive to echo strength for different polarization pairs (first transmit-receive and second transmit-receive). Neither the transmit nor receive polarizations associated with either video 1 or with video 2 need be the same. However, at lest one of the polarizations, for example, transmit polarization for video 1, receive polarization for video 1, transmit polarization for video 2 or receive polarization for video 2, must be different from the other three polarizations used.

The amplitudes of videos 1 and 2 are compared in the comparator 16 and on the basis of relative amplitude a gate signal 18 is obtained for further signal processing. In other words, the video 1 and 2 signals that are each of substantial magnitude are compared and, based on pre-selected ratios of the amplitudes of these signals, a gate signal 18 is obtained. The pre-selected ratios are established by the comparator 16 plus other such interrelated components as video 1 and 2 circuits, the radar transmitter-receiver 11, the antenna system 10 and radar target characteristics.

The gate signal 18 may be used directly as a radar output; it may be processed further and used as a radar output; or it may be used in the processing of other radar transmitter-receiver outputs such as those of video 1 and video 2. To illustrate, suppose a target of interset is a sphere, suppose the polarizations are selected as described above, and suppose the radar parameters are chosen so that the amplitudes of videos 1 and 2 are equal for a sphere. Suppose the comparator 16 is set so that a gate signal is obtained from the comparator 16 only when videos 1 and 2 are such that the ratio is near unity. Under these conditions and with other appropriately selected polarizations, a gate signal 18 would seldom be caused by echo from land or sea. Therefore, spheres and other targets that meet the previously selected polarization characteristics would be displayed as targets and other echoes would be suppressed.

The comparator 16 could, of course, be responsive to more than one band or range of ratios such as that described above as being "near unity." Therefore a gate signal can be provided so as to yield target selectivity based on pre-selected polarization ratios.

The embodiments of the present invention may be made with components that are well known to the radar art. The antenna can be of the reflector type, with illumination by a dual linear polarization feed aligned to maximize the reception of a horizontally polarized wave with one feed output and thereby maximize the reception of vertical polarization for the other output. It is noted here that most types of land and sea clutter will be satisfactorily suppressed relative to target echo even if other feed alignment angles are used. However, this disclosure outlines special use of the reception of horizontal and vertical polarizations for the processing of sea spikes and other echoes.

A single antenna can be used for transmitting and receiving a variety of polarizations through use of dual polarization devices called dual mode or polarization diversity couplers. Details for constructing a dual mode coupler and references for both linear and circular polarization dual-mode devices are given in the paper "Dual-Mode Coupler", *IEEE Transactions on Microwave Theory and Techniques,* Vol. MTT-15, November 1967, pp. 651–652, by R. C. Johnson, F. L. Cain and E. N. Bone. Alternatively, various polarizations can be obtained by using a separate antenna for each polarization.

"Received polarization 1" is defined as the echo wave polarization to which the amplitude of video 1 is responsive; video 2 is similarly proportional to "received polarization 2." The abbreviations H, V, L, and R will be used to denote horizontal, vertical, left circular, and right circular polarizations.

Figure 2:
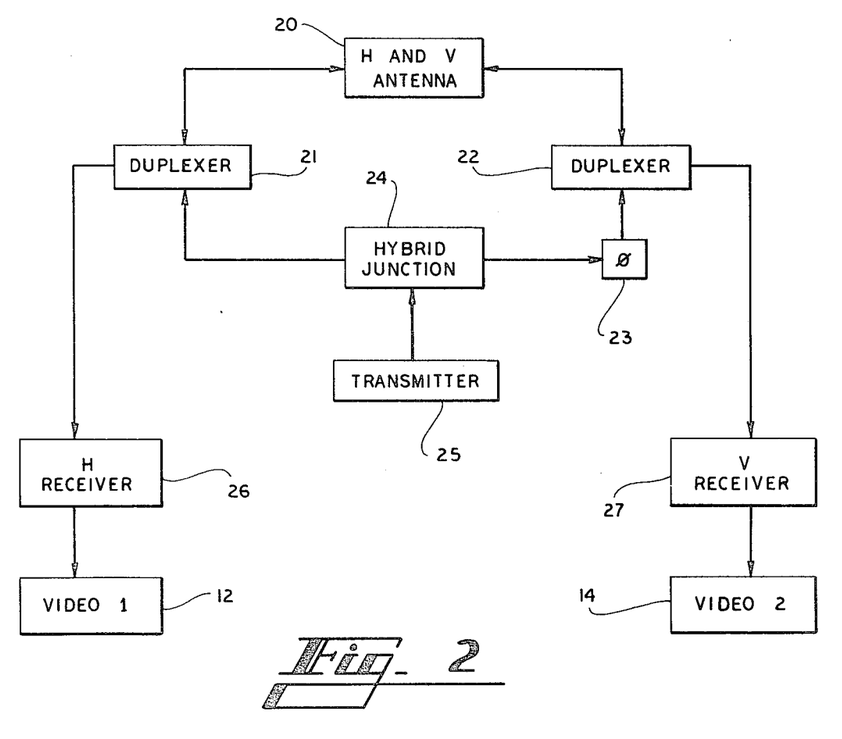
FIG. 2 is a block diagram of a first alternative embodiment of an apparatus signal conditioning system.
Figure 3:
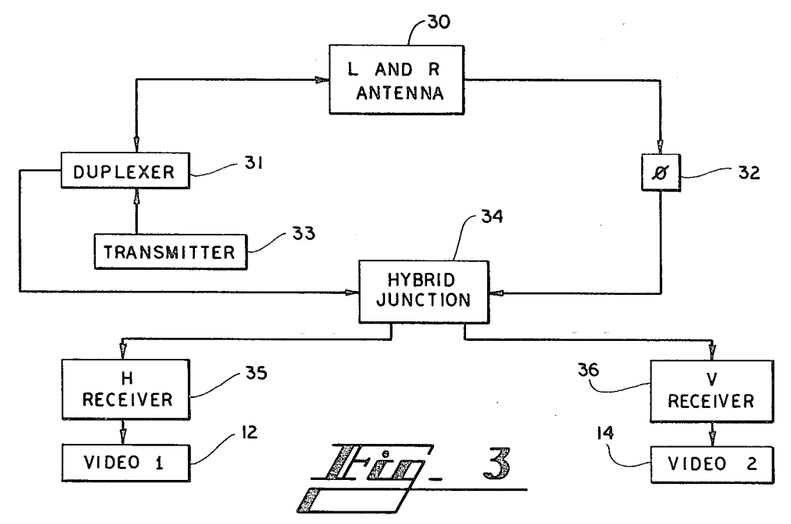
FIG. 3 is a block diagram of a second alternative embodiment of a signal conditioning system.
Figure 4:
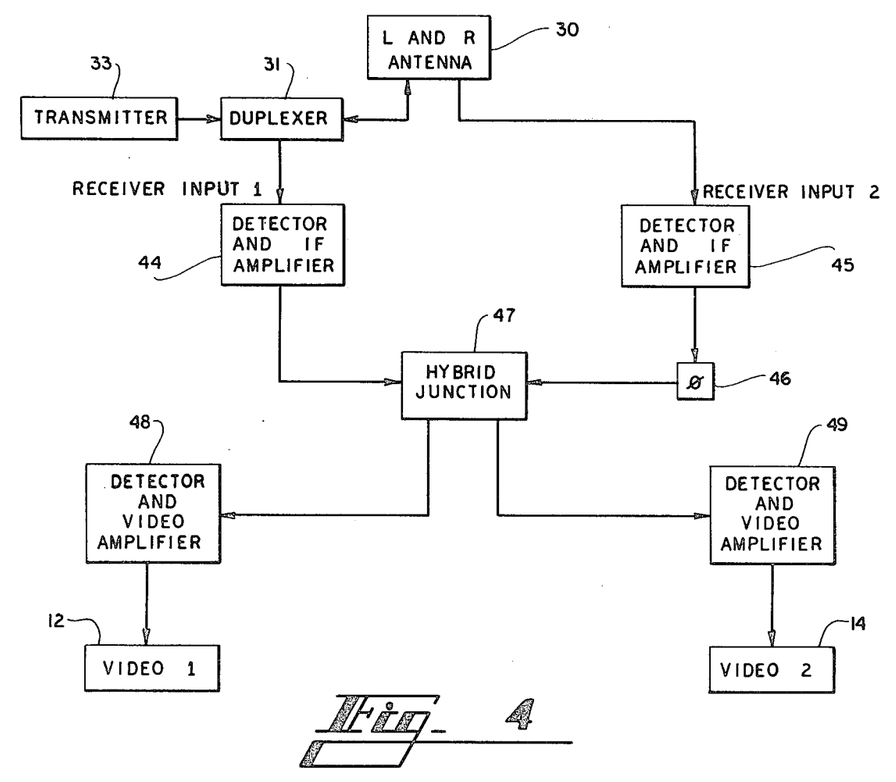
FIG. 4 is a block diagram of a third alternative embodiment of a signal conditioning system.

FIGS. 2, 3 and 4 give examples of signal conditioning in a signal conditioning system 15 of FIG. 1 providing the outputs at video 1 and video 2. In FIG. 2, the power from the transmitter 25 is divided in a hybrid junction 24 so that equal H and V signals are transmitted by the H and V antenna, 20. Duplexers 21 and 22 are provided so that return signals may also be received through the H and V antenna system 20. In this configuration, "received polarization 1" is H and "received polarization 2" is V. There are applications for which the relative phase $\phi$ is unimportant. However, the apparatus shown is capable of adjusting the phase between the transmitted signals, as is represented in the block diagram at 23, so that if $\phi$ equals 90° the transmitted wave is circularly polarized. An important advantage for transmit circular polarization when receiving H and V polarizations results because $\sigma_{RH} = \sigma_{RV} = \sigma_{LH} = \sigma_{LV}$ for a metal diplane, irrespective of seam orientation. Therefore, for this choice of polarizations the ratio of the amplitudes of the video 1 and the video 2 signals will not vary with tilt of the diplane.

In FIG. 3, the antenna 30 radiates a circular polarization and receives both left- and right-circular polarizations; the relative phase $\phi$, represented as block 32, is such that after the received signals are combined in the hybrid junction 34 the resultant signals are such that "received video 1" is H and "received video 2" is V. The configurations of FIGS. 2 and 3 are exemplary of system designs that meet the basic requirements for ratios so that targets are enhanced relative to clutter.

FIG. 4 illustrates an alternative method of constructing FIG. 3. In FIGS. 3 and 4 the antenna 30 receives L and R. As already noted, for FIG. 3 the inputs to the receivers 35 and 36 are proportional to H and V. In FIG. 4, signals at intermediate frequency that are proportional to L and R are amplified in 44 and 45 and added with appropriate phase in hybrid junction 47 so that the inputs to 48 and 49 are proportional to H and V. It should be noted that FIGS. 2, 3 and 4 are each embodiments of signal conditioning system 15 for which the video 1 and video 2 signals are proportional to the echo strengths for H and V polarizations. Therefore, the receive polarizations for each of these embodiments are H and V even though the antenna 30 used in FIGS. 3 and 4 is an L and R antenna.

The operation of a preferred embodiment wherein the relative strengths of video 1 and video 2 are compared when using HH and VV polarizations is described below. By definition, HH means H only is transmitted and H only is received, VV means V only is transmitted and V only is received. Therefore, strictly speaking, HH and VV echoes cannot be obtained simultaneously but they can be obtained in practice by transmitting and receiving H and then transmitting and receiving V within time intervals short compared with the important fluctuation rates of the echoes.

Assume the transmit and receive polarization is switched between H and V on a range-sweep to range-sweep basis, i.e., for one range-sweep transmit and receive polarizations are H (video 1) and shortly thereafter for another range-sweep the transmit and receive polarizations are V (video 2). Then, by conventional radar store and delay techniques the echo signals as a function of range for video 1 can be received and stored, and then compared with those for video 2. Therefore, if the transmitter range sweep repetition rate is sufficiently fast, one can obtain in essence a comparison of echo strength for transmit H-receive H with echo strength for transmit V receive V, and this can be accomplished for each radar resolution cell.

There are numerous polarization combinations possible that meet the basic concepts of this invention which can be obtained by switching either the transmit polarization or the receive polarization or switching both transmit and receive polarizations. Examples of wave switching modes are given in Table 1.

TABLE 1

| | Switching modes | |
| --- | --- | --- |
| Transmit Polarization | Number of Receivers | Received Polarization |
| Fixed | 1 | Switched |
| Fixed | 2 | Switched |
| Switched | 1 | Fixed |
| Switched | 1 | Switched |
| Switched | 2 | Switched |

Another of several advantages of switching transmitted polarization is now illustrated that combines the use of this invention with a classical use of circular polarization.

Circular polarization has long been used to reduce echo from rain relative to that from certain targets, principally aircraft. Experience has shown that if the same sense circular polarization is received having the same sense as the circular polarization transmitted, the echo from rain is reduced more than that of aircraft. The reason for this is clear when it is recalled that for rain the ratios $\sigma_{RL}/\sigma_{RR}$ and $\sigma_{LR}/\sigma_{LL}$ are large but for aircraft those ratios are on the average considerably less than they are for rain.

In order to obtain the aforementioned benefits of circular polarization, assume that one circular polarization is transmitted and received to obtain a video 1 signal. For the next range sweep, assume the other circular polarization is transmitted and received to obtain a video 2 signal. It should be noted that rain echo relative to aircraft (and some other targets) will have been reduced in the video 1 and 2 signals because one signal was obtained from LL echo and the other from RR echo. However, LL echo and RR echo are not identical for all targets. As previously discussed, by radar store and delay techniques the video 1 signals as a function of range can be received and stored, and then compared with those of video 2. By this means land and sea clutter can also be suppressed because the gate signal from the comparator will be obtained more often for aircraft than for land and sea clutter because the ratios of the amplitudes of videos 1 and 2 will vary over a smaller range for aircraft than for extended land or sea surfaces. Therefore, video 1 and video 2 will each contain signals for which rain echo will have been suppressed relative to that of aircraft and other similar targets and the gate signal will be obtained more often for aircraft than for land and sea clutter because the ratio of $\sigma_{RR}/\sigma_{LL}$ will vary over wider ranges for clutter than for aircraft.

One important feature of this invention for suppressing clutter is that of using a predetermined band of ratios, or bands of ratios, corresponding to those of a desired target or targets to activate the processing of received signals for the radar output. Since the ratios for clutter usually vary over ranges much wider than those for targets, this feature automatically reduces the percentage of clutter signals that are contained in the radar output.

Another feature important to suppressing clutter is that two transmit-receive polarization pairs can be selected to reject echo from objects that do not depolarize. One such example is that of spikes caused by sea swell for which echo amplitude for HH polarization is equal to or greater than that for VV polarization. Based on the reflecting properties of water, for swells without ripples, HH echo power will usually exceed that for VV by less than a factor of 2, and HH echo power will rarely be a factor of 10 larger than VV echo power. For purposes of implementation, it should be recalled that for a smooth dielectric surface the strength of RH (or LH, HL, HR) echo relative to RV (or LV, VL, VR) echo strength is equal to the strength of HH echo relative to VV echo strength.

FREQUENCY AGILITY

For a fixed frequency radar, echo strength fluctuates because of changes in the orientations and relative positions of objects within a radar resolution cell. A change in radar frequency will also change echo strength, and therefore rapid changes in frequency (frequency agility) is sometimes used to increase echo fluctuation rates. The book *Radar Design Principles,* McGraw-Hill Book Company, New York, 1969, by F. E. Nathanson outlines certain advantages of frequency agility that are repeated here. By using frequency agility, clutter can be displayed more uniformly and at a level that is weaker than the storing clutter signals that are sometimes present. Further, the probability of target echo strength being at or near a null can be substantially reduced by using frequency agility. It should be apparent that the attributes of frequency agility can be used to advantage with embodiments of this invention.

COMPARISONS OF FREQUENCIES

This section describes embodiments of the invention that use two or more transmit carrier frequencies for clutter suppression and target classification. Effects of frequency changes on radar echo are described in the previously referenced book by F. E. Nathanson.

A first principle of this invention is that the amplitudes of two echoes from a target are statistically independent, and therefore unpredictable, if the echoes are for two transmit carrier frequencies that differ by at least $\Delta f_c$, where $$\Delta f_c = (c/2L_e) \qquad (1)$$

Here c is the speed of light, and $L_e$ is defined as the effective target length.

Based on theory and experiment, it is known that the echoes from a large number of distributed targets (scatterers) such as rain drops are decorrelated (independent) if the difference in carrier frequency $\Delta f_c$ is in accordance with equation 1, where $L_e$ is equal to the radial extent (measured along radar beam) of the scatterers that are being illuminated. It follows, therefore, that if the scatterers fill the radar cells of resolution, the effective length $L_e$ is equal to the length in range of the radar resolution cell. Since the range resolution for a pulse radar is $c\tau/2$, where $\tau$ is the pulse length, $\Delta f_c$ equals $1/\tau$ if the clutter source fills a radar cell of resolution.

Echo strength for a single sphere is insensitive to small changes in frequency. Therefore, the effective length $L_e$ is approximately zero. However, $L_e$ for a cluster of many such spheres that are randomly distributed is equal to the smallest of the following: the cluster length (measured along the radar beam) or $c\tau/2$.

For a man-made target that does not contain a large number of separate scatterers, $L_e$ may be considerably smaller than its physical length measured along the radar beam. For the purposes of analysis here, it is estimated that the echo amplitudes for two carrier frequencies will be nearly equal (fixed target orientation assumed) providing the difference in carrier frequencies is less than $$\Delta f_c = (c/20L_p),$$

where $L_p$ is the physical length of the target measured along the direction of the radar beam.

In this invention, a gate signal that permits signals to be processed as target signals is generated only if the relative magnitude of the two video signals resulting from the two transmit frequencies is within a predetermined range of ratios. In other words, for receiving channels of equal gain, video signals are processed as if due to a target only if the relative magnitude of said video signals is within a band of ratios near unity; otherwise, signals do not reach the radar output. Therefore, transmit frequencies are selected so that echo due to area extensive sources will be rejected a higher percentage of time than will echo from desired targets.

FIG. 1 is a block diagram of a preferred embodiment of the invention. The antenna system 10 and the radar transmitter-receiver 11 are provided so that there are receiver video output signals responsive to target echo strength for different transmitter frequencies. For example, video 1, shown as block 12, might be responsive to transmitting and receiving a carrier frequency $f_1$ and video 2, shown as block 14, might be responsive to transmitting and receiving a carrier frequency $f_2$. It should be recognized here that $f_1$ and $f_2$ might each represent a group or ensemble of transmitter frequencies. For example, $f_1$ might be the sequence of frequencies at the output of the frequency agile radar transmitter of block 11, and $f_2$ might be the same sequence shifted by one interpulse period. In other words, the video 2 signals might be responsive to the same transmit frequencies that cause the video 1 signals except that they are delayed by one transmitter interpulse period. For this example, two video signals are obtained simultaneously from blocks 12 and 14 and are each responsive to a different transmit frequency. The delay necessary to obtain the video 2 signals can be accomplished by conventional radar store and delay techniques.

The amplitudes of videos 1 and 2 are simultaneously compared in the comparator 16 and depending on relative amplitude, a gate signal 18 is generated for further signal processing. In other words, the video 1 and 2 amplitudes are compared and if the ratio of the amplitudes is within a pre-selected range of ratios, a gate signal 18 is generated. The pre-selected ratio is established by the comparator 16 plus other such interrelated components as the video 1 and 2 circuits, the radar transmitter-receiver 11, and the antenna system 10.

There are many combinations (codes) that can be used for changes (differences) in transmit frequency. Such coding in magnitude of frequency change (difference) can be used for highlighting targets based on effective length $L_e$. For example, suppose that half the frequency differences are of a relatively small value $\delta f$ such that: (a) the corresponding video amplitudes within each cell of resolution are decorrelated for clutter and, (b) the corresponding video amplitudes are highly correlated for all targets of interest. Suppose further that half the frequency differences are $\Delta f$, with $\Delta f$ being larger than $\delta f$, and with $\Delta f$ such that: (c) the corresponding video amplitudes for large targets, e.g., ships, are on the average decorrelated and, (d) the corresponding video amplitudes for small targets, e.g., buoys, are highly correlated. In the example cited, a comparator signal would: (a) seldom be generated for clutter, (b) be generated approximately half the time for ships and, (c) be generated nearly all the time for buoys.

Figure 5:
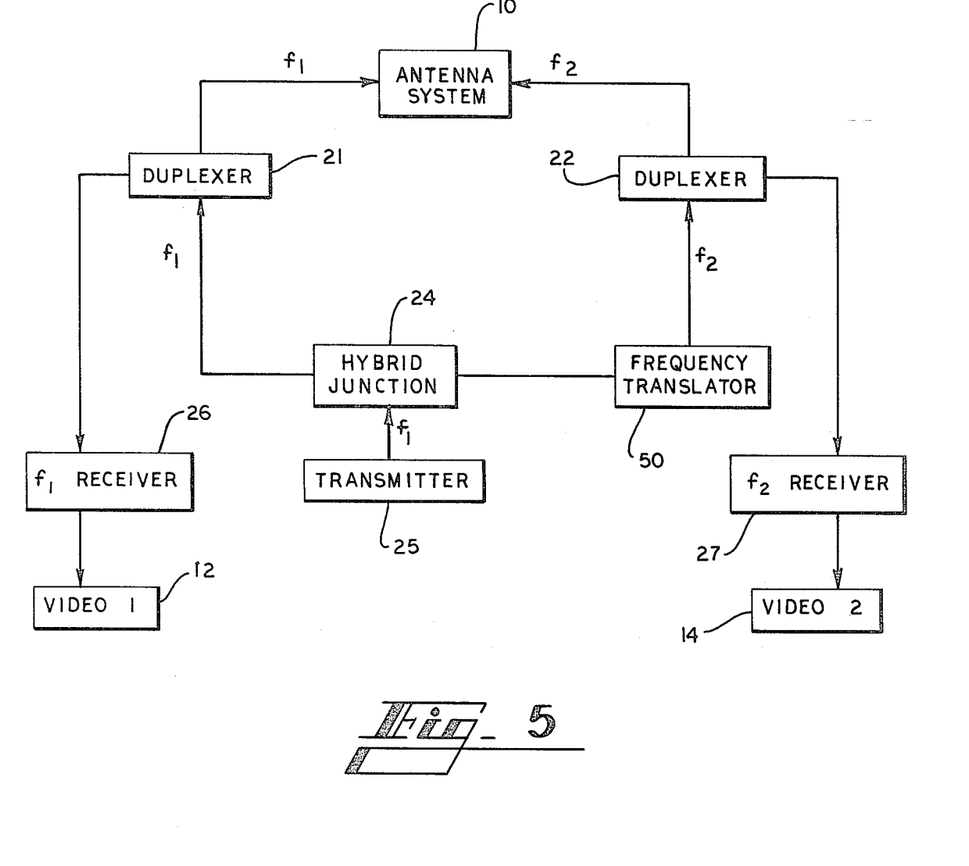
FIG. 5 is a block diagram of a fourth alternative embodiment of a signal conditioning system.

The discussion above has been based on comparing video signals resulting from transmitting only one carrier frequency at a time. Alternatively, the video 1 and video 2 signals can be obtained also by the simultaneous transmission of two pulses with different carrier frequencies and the simultaneous reception of echoes for those two transmissions. The frequency changes required can, of course, be obtained by changing the frequency of either one or more transmitters. FIG. 5 illustrates an embodiment for which two carrier frequencies are transmitted simultaneously.

For the embodiment of FIG. 5 a frequency agile transmitter 25 generates an output with a different frequency $f_1$ for each successive range sweep. This output is divded by the hybrid junction 24 into two parts. An output signal of frequency $f_1$ reaches the antenna system 10 through the duplexer 21, and an output signal of frequency $f_2$, created by the frequency translator 50, reaches the antenna system 10 through the duplexer 22. Thus, the antenna system 10 radiates two signals of carrier frequencies $f_1$ and $f_2$. It should be understood that in the embodiment of FIG. 5 $f_1$ and $f_2$ differ by a constant amount determined by the frequency translator 50, and therefore $f_1$ and $f_2$ are each changed for successive range sweeps by the frequency agile transmitter 25.

The radar echoes for the $f_1$ frequencies and those for the $f_2$ frequencies are received by the antenna system 10. Received frequencies $f_1$ reach the $f_1$ receiver 26 through duplexer 21 and are detected and processed so that video signals responsive to echoes at those frequencies are obtained at the video 1 output 12; signals responsive to echoes at the $f_2$ frequencies are obtained at the video 2 output 14 after reaching the $f_2$ receiver 27 through duplexer 22 from the antenna system 10. For each range, video 1 and video 2 signals are thus obtained simultaneously. It is apparent that such simultaneously obtained signals can be processed as previously explained with a comparator 16 and signal processor 17 means as illustrated in FIG. 1.

Suppose the difference between the $f_2$ and $f_1$ frequencies is at least as large as $\Delta f_c$ in equation (1) for a given echo source. Then the magnitude of the video 1 signal relative to the magnitude of the video 2 signal is unpredictable. Without target or radar motion, if $f_1$ were not changed the successive $f_1$ echoes and successive $f_2$ echoes would be unchanged. It should therefore be clear that the transmitter 25 output frequency $f_1$ must change by at least $\Delta f_c$ of equation (1) for assurance that the relative magnitudes of the video 1 and video 2 signals differ a large percentage of an arbitrary time interval.

Some of the features of the embodiment of FIG. 5 will now be explained with a numerical example. Suppose the transmitter pulse length is 1 microsecond and suppose that clutter extends over many radar resolution cells. Then, from material already cited, $L_c$ (clutter) = 150 m.

Also assume effective lengths $L_e$ of 5 mm and 0.5 m for targets. Therefore, the changes in frequency required to assure uncorrelated echo amplitudes are:

$\Delta f_c$ (clutter) = 1 MHz $\Delta f_c$ (5 m target) = 30 MHz $\Delta f_c$ (0.5 m target) = 300 MHz Suppose there is no target or radar platform motion, and $f_2$ differs from $f_1$ by 3 MHz. Then, for both targets the video 1 and video 2 amplitudes will always be nearly equal and unpredictable for the clutter. If the changes in transmitter frequency $f_1$ are at least 1 MHz between pulses, the percentage of time that gate pulses are generated by the comparator for clutter will be small compared to such percentages for the targets. If the changes in $f_1$ were 30 MHz, the video 1 pulses would be uncorrelated (same for the video 2 pulses) for the 5 m target but correlated for the 0.5 m target. Even so, with $f_2$ less $f_1$ equals 3 MHz, the video 1 and video 2 target pulses obtained simultaneously would be nearly equal. It will from the discussion here be apparent that target selectivity can be accomplished by appropriately choosing the frequencies to be used.

It should now be clear that a basic feature of this invention is that of using a predetermined band of ratios, in combination with appropriate carrier frequency differences. This feature reduces the percentage of clutter signals that must be processed.

USE OF OTHER DISCRIMINANTS

The use of different polarizations and different frequencies has been described for (a) obtaining videos 1 and 2 signals for which the ratio of amplitudes fluctuates widely for clutter and for (b) which this ratio due to a target fluctuates less widely than it does for clutter.

Another method of accomplishing (a) and (b) above is to process video 1 and video 2 signals that are caused by echo from different resolution cells, per se. For example, video 1 might be obtained for transmitter pulses of one length and video 2 for pulses of a different length. Then, by radar store and delay techniques, video 1 can be compared with video 2. In this manner the relative magnitude of two signals from different but overlapping resolution cells can be obtained. Thus, echo from a target that is in both cells can be processed as target echo at the radar output. Another method of comparing different but overlapping resolution cells is to compare video 1 echo for beamwidth 1 and video 2 echo for beamwidth 2. Obviously, various combinations of beamwidths and pulse lengths can be used.

Different but overlapping antenna beam pointing directions can also be used for obtaining different video 1 and video 2 signals. For example, suppose that the beam is scanned continuously in azimuth. Then by radar store and delay techniques, signals due to echo from one beam direction can be compared with the echo from another beam direction. Then with appropriate time delays for comparative purposes, target echo can be received and compared for different pointing directions.

FIG. 2 can be used to illustrate other methods by which video 1 and video 2 can be responsive to different antenna pointing directions. Suppose antenna 20 is replaced by one with two primary feeds that are displaced from the reflector axis so that the antenna beam pointing directions are different for the two feeds. Then, on reception video 1 and video 2 are responsive to different antenna pointing directions. The two feeds can be of the same or different polarizations. Assume that the feeds are for H and V polarizations to suppress sea spikes. Then the phase shift $\phi$, 23, can be set so that the polarization at the peak of the transmit beam is circular. If feeds of the same polarization are used, the phase shift $\phi$, 23, should be set to maximize the transmit beam.

As previously described for FIG. 5, pulses of equal length with carrier frequencies $f_1$ and $f_2$ are simultaneously transmitted. Suppose the output pulses of the frequency translator 50 are shortened by a high-speed switch or attenuator that is actuated by the transmitter 25. Such a switch or attenuator can be inserted between the frequency translator 50, and the duplexer 22. Then, video 1 and video 2 would be responsive to different transmitter pulse lengths.

FIG. 5 can also be used to illustrate a method by which video 1 and video 2 can be responsive to different antenna beamwidths. Suppose the two terminals of antenna 10 represent two primary feeds that illuminate a reflector so that the beamwidths for $f_1$ and $f_2$ are different. Then, video 1 and video 2 are responsive to different antenna beamwidths.

FIG. 5 is now used to illustrate the simultaneous use of frequency differences to suppress rain echoes and polarization differences to suppress sea spikes. Both discriminates will contribute toward reducing homogeneous sea clutter. Assume that antenna system 10 is replaced by the H and V antenna 20 of FIG. 2. Now, video 1 is responsive to transmit-receive horizontal polarization for carrier frequency $f_1$ and video 2 is responsive to transmit-receive vertical polarization for carrier frequency $f_2$. It should be noted that the polarization pairs HH and VV can be used simultaneously because different carrier frequencies are simultaneously used.

Signal Processing

Figure 6:
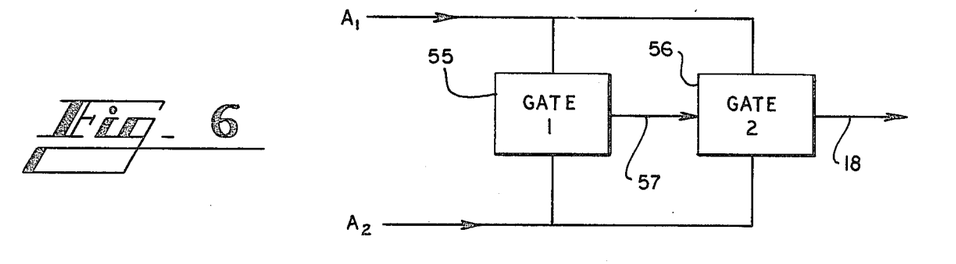
FIG. 6 is a block diagram of a preferred embodiment of two gates in series to form a simple comparator.

FIG. 6 illustrates a preferred embodiment of comparator 16 of FIG. 1. $A_1$ and $A_2$ represent output amplitudes of videos 1 and 2, shown as 12 and 14 in FIG. 1. For the comparator of FIG. 6, gates 1 and 2, shown as 55 and 56, are in series so that a comparator output 18 occurs only if both gate 1, 55, and gate 2, 56, pass a signal. To illustrate the performance characteristics of the comparator of FIG. 6, assume gate 1 passes a signal 57 if $A_1$ is greater than $0.8A_2$ and gate 2 passes signal 18 only if (1) signal 57 exists and (2) if $A_1$ is less than $1.25A_2$. Then, a comparator output 18 occurs only if $A_1$ is greater than $0.8A_2$ and less than $1.25A_2$. It should be noted that gate 1 alone will function as a comparator for which a comparator signal is generated if $A_1$ is greater than $0.8A_2$. In that case the signal 57 of FIG. 6 would be used as the comparator output.

The operation of the signal processor 17 is not restricted to a specific signal processing technique. For example, the comparator 16 might provide a train of equal amplitude pulses when the ratio of the amplitudes of videos 1 and 2 is within a preselected range. Those pulses can be further processed in the signal processor 17 or can be used to gate on either, or both, the video 1 and video 2 signals for further processing.

The processing of the comparator pulses instead of the video 1 or video 2 signals can sometimes be advantages. In that case all signals to be processed, whether from a target or from a spurious source, can be of equal amplitude independent of range. This eliminates the usual requirement for processing extremely wide ranges in signal amplitude resulting, e.g., because echo amplitude for a given target is a strong function of range. Another advantage of processing equal amplitude comparator pulses is that these "clutter" pulses are then never larger than the pulses from a target, even though the actual clutter echo might be much larger than the target echo.

A useful method of signal processing is based on the fact that gate pulses are generated more often for targets than for clutter. Therefore, the gate pulses may be continuously supplied to an integrator in the signal processor 17 and a threshold level following the integrator may be selected so that echo of desired targets is displayed and clutter is rejected.

A number of methods of coding have been outlined for changes in transmit frequency to suppress clutter, and for providing target classification based on effective target length along the radar beam. It will be apparent that the methods can be extended through the use of more complex codes and through the simultaneous use of more than two transmit frequencies.

The Cascading of Comparator Outputs

Figure 7:
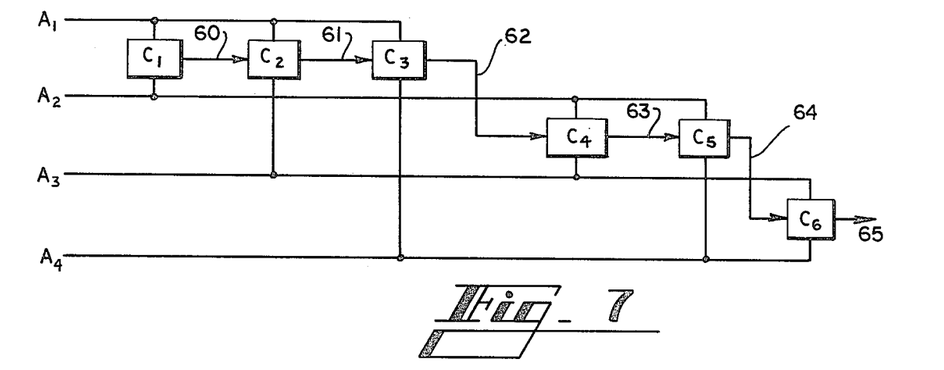
FIG. 7 is a block diagram of a preferred embodiment of cascaded comparators.

The discussion thus far has been based on comparing two received video signals with one comparator. Alternatively, three or more operatives can be used to obtain three or more different received video signals and each pair of said video signals can be compared with a different comparator. Then, each comparator can be cascaded as illustrated in FIG. 7. FIG. 7 is represented simply as comparator 72 in FIG. 8. FIGS. 9–12 show preferred embodiments for signal conditioning means for providing four received video signals, called videos 1 through 4, that have amplitudes $A_1$ through $A_4$.

In FIG. 7 $A_1$ through $A_4$ represent the amplitudes of received video signals that are compared with comparators $C_1$ through $C_6$. Comparator $C_1$ provides an output signal 60 if the ratio of amplitudes $A_1$ and $A_2$ are within a predetermined range of ratios. Comparator $C_2$ generates signal 61 if signal 60 exists and if the ratio of amplitudes $A_2$ and $A_3$ is within some predetermined range of ratios. Similarly, comparator $C_3$ generates signal 62 if signal 61 exists and if the ratio of amplitudes $A_1$ and $A_4$ is within a predetermined range of ratios. By following this reasoning it is finally seen that $C_6$ generates comparator output 65 if signal 64 exists and the ratio of amplitudes $A_3$ and $A_4$ is within a predetermined range of ratios. In other words, comparator $C_6$ output 65 will exist only if all of the various ratios of $A_1$, $A_2$, $A_3$ and $A_4$ are within certain predetermined ratios.

FIG. 8 illustrates the use of cascaded comparators that are depicted in FIG. 7. Recall that for $A_1$ through $A_4$ represent the amplitudes of four different received video signals. These amplitudes are simultaneously compared in comparator 72, comprising cascaded comparators. On the basis of the various relative amplitudes of $A_1$ through $A_4$ gate signal 65 may or may not be obtained. The gate signal 65 may be used directly as a radar output; it may be processed further and used as a radar output; or it may be used in the processing of other radar transmitter-receiver outputs such as the four received video signals with amplitudes $A_1$ through $A_4$.

Figure 9:
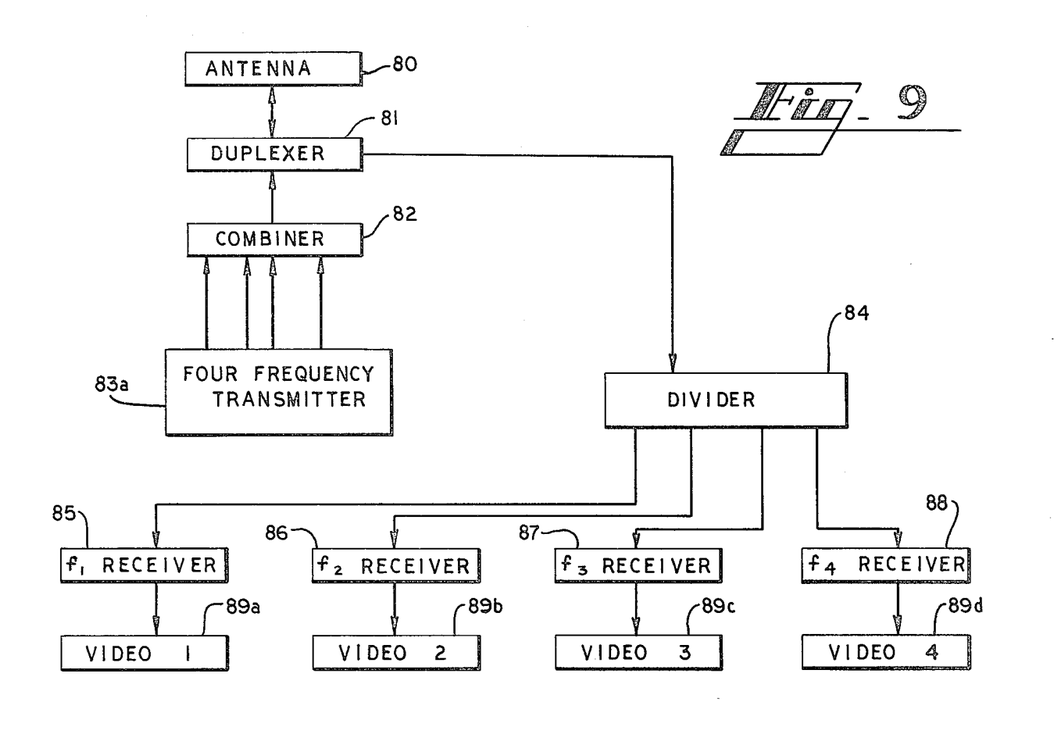
FIG. 9 is a block diagram of a sixth alternative embodiment of a signal conditioning system.

In FIG. 9 the operatives are four carrier frequencies $f_1$ through $f_4$ that are transmitted simultaneously and generated by a four frequency transmitter 83a wherein the differences between the frequencies are fixed. This transmitter can be constructed by using one transmitter operating at frequency $f_1$ and three frequency translators to generate $f_2$, $f_3$ and $f_4$. The four carrier frequencies are separately received by four receivers 85 through 88.

Figure 10:
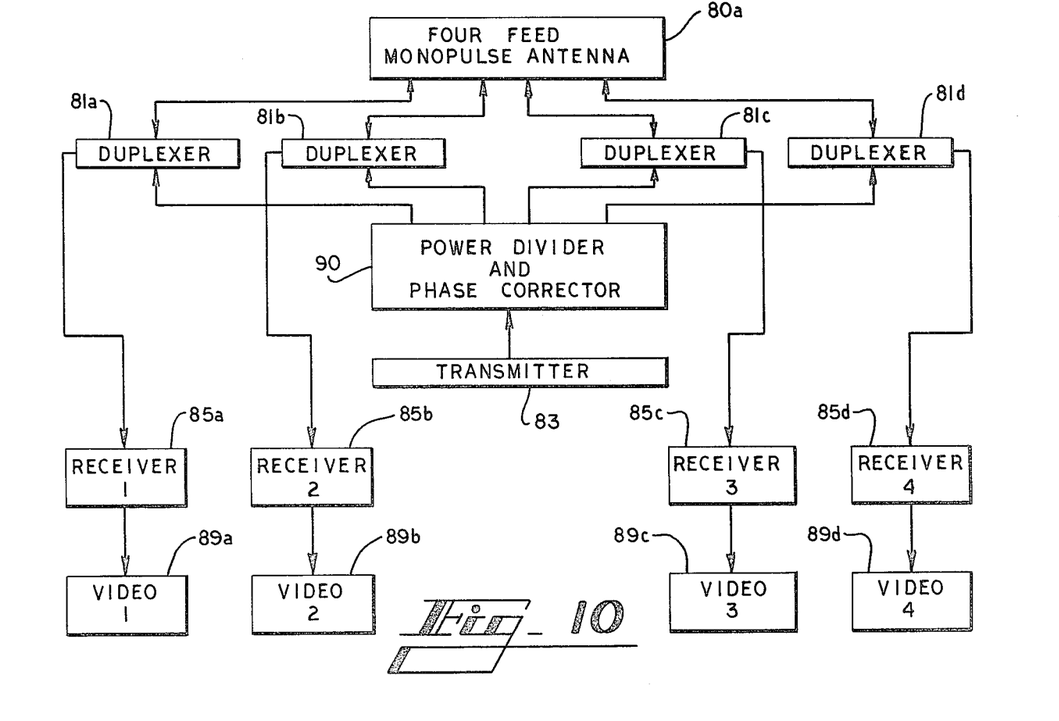
FIG. 10 is a block diagram of a seventh alternative embodiment of a signal conditioning system.

In FIG. 10 the operatives are four antenna pointing directions as is practiced with monopulse radar and described in the book *Radar Handbook*, McGraw-Hill Book Company, New York, 1970, by M. I. Skolnik. The power from the transmitter 83 is equally divided and the phases are corrected with the power divider and phase corrector 90 to provide one transmit beam from antenna 80a, as is practised with monopulse radar. On reception there are four receive beams, one for each feed, and therefore four received video signals, 89a through 89d, are obtained.

Figure 11:
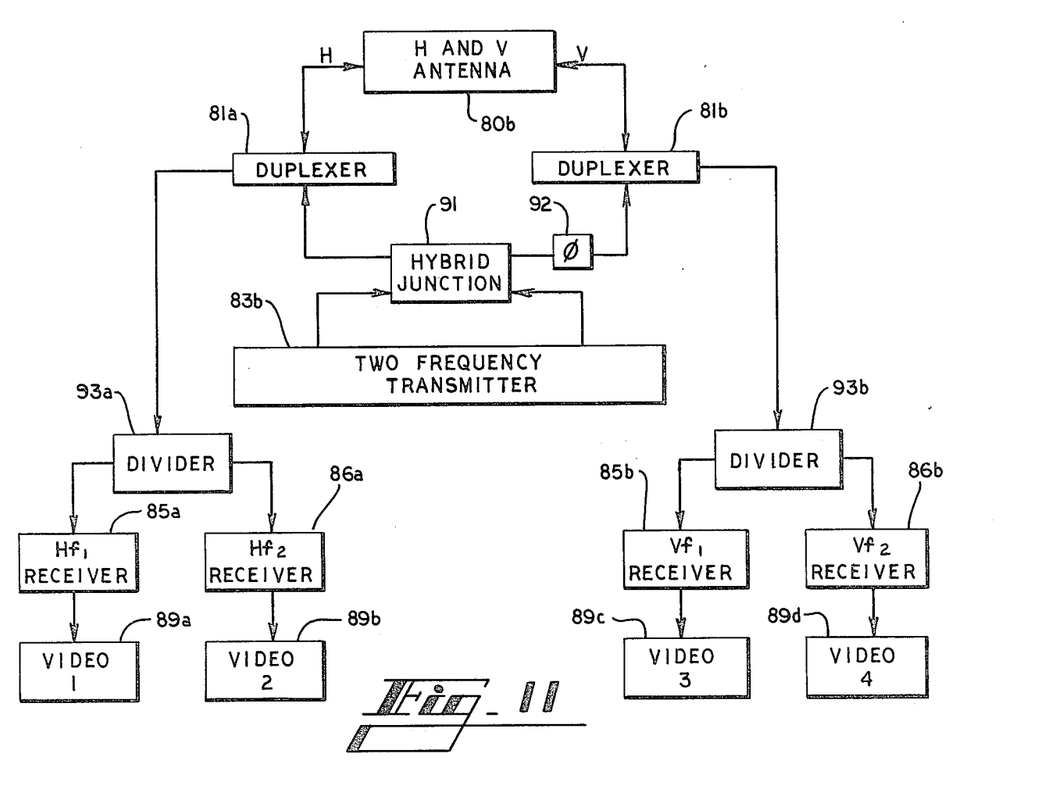
FIG. 11 is a block diagram of an eighth alternative embodiment of a signal conditioning system.

In FIG. 11 the operatives are two carrier frequencies and two polarizations. H and V polarizations are transmitted and received with antenna 80b. Two transmit carrier frequencies $f_1$ and $f_2$ are simultaneously generated by a two frequency transmitter 83b wherein the difference between $f_1$ and $f_2$ is fixed. This transmitter can be constructed by using one transmitter operating at $f_1$ and a frequency translator to generate $f_2$. It should be noted that video 1, 89a is responsive to polarization H and frequency $f_1$; video 2, 89b, is responsive to polarization H and frequency $f_2$; video 3, 89c, is responsive to polarization V and frequency $f_1$; and video 4, 89d, is responsive to polarization V and frequency $f_2$. Phase shift $\phi$, 92, is provided to permit the transmit polarizations for both $f_1$ and $f_2$ to be circular. It should be apparent that the H and V antenna, 80b, can be replaced by an antenna with two feeds of one polarization for providing different antenna pointing directions. Then, the phase shift $\phi$, 92, can be adjusted so that there is one transmit beam direction even though there are two receive beam directions. Also note that the two antenna feeds can have different beamwidths, thereby permitting the use of two antenna beamwidths as operatives.

Figure 12:
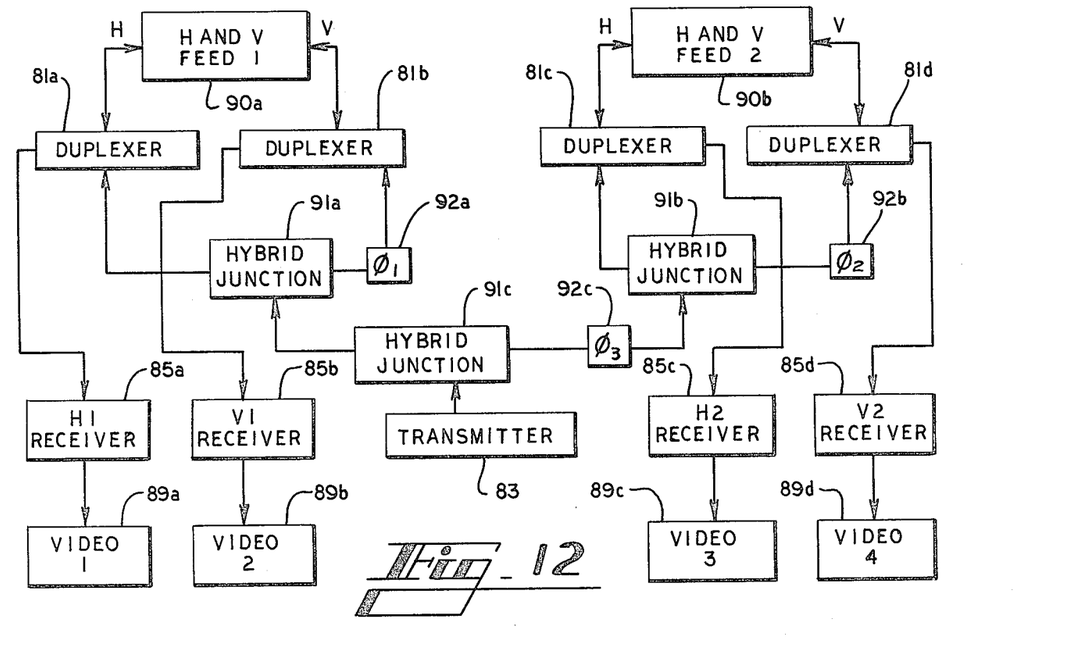
FIG. 12 is a block diagram of a ninth alternative embodiment of a signal conditioning system.
Figure 13A:
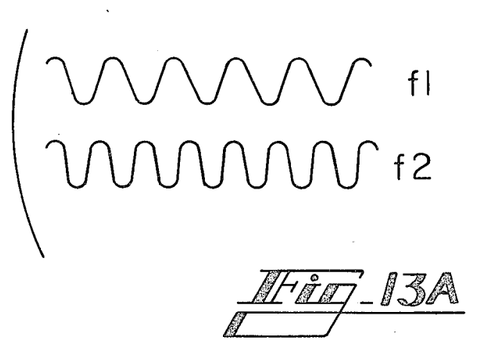
FIGS. 13A—13D are graphic representations of using carrier frequency, antenna beam pointing direction, antenna beam width, and transmit pulse length as discriminants.
Figure 13B:
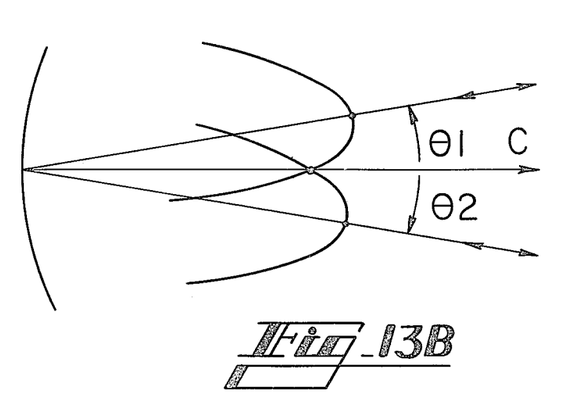
Figure 13C:
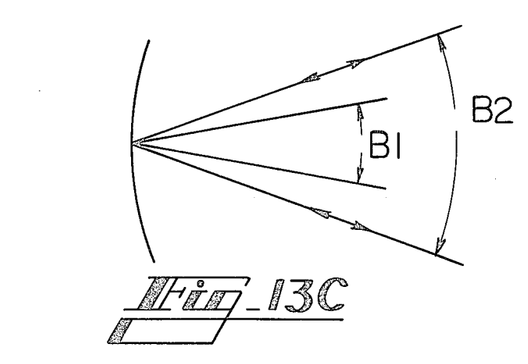
Figure 13D:
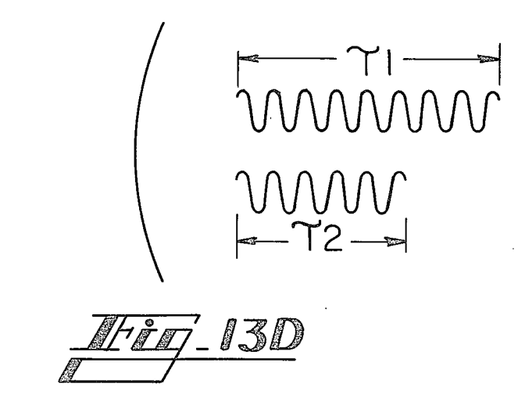

In FIG. 12 the operatives are two polarizations and two antenna beam pointing directions. There are two antenna feeds, 90a and 90b, each for H and V polarizations. These feeds can illuminate a reflector so that two antenna beam directions are available on reception. Phase shifts $\phi_1$ and $\phi_2$, 92a and 92b, are provided so that the transmit polarizations from both of the feeds, 90a and 90b, are either right circular or left circular. The transmitter 83 generates power that is equally divided by the hybrid junction 91c and the transmitter power is again equally divided by the hybrid junctions 91a and 91b. Therefore, each feed 90a and 90b receives equal transmit power. Then, by properly selecting phase shift $\phi_3$, 92c, there will be only one transmit antenna beam pointing direction and the transmit polarization will be either right or left circular. On reception there are two antenna beam directions, one received by feed 1, 90a, and the other received by feed 2, 90b. Also note that both H and V polarizations are received by each antenna feed. Therefore, through use of four receivers, 85a through 85d, there are four received video signals at videos 1 through 4, 89a through 89d. It can be seen that video 1, 89a, is receptive to H polarization and a first pointing direction; video 2, 89b, is receptive to V polarization and said first pointing direction; video 3, 89c, is receptive to H polarization and a second pointing direction; and video 4, 89d, is receptive to V polarization and said second pointing direction.

Interference and Sidelobe Suppression

The disclosed embodiments contain certain advantages for interference suppression and improving effective antenna patterns. Assume that the system is operating so that radar output is obtained only if videos 1 and 2 are nearly equal. Then, for an extraneous signal to be processed as a target, it must somehow produce nearly equal amplitudes at videos 1 and 2.

The ability of providing an improved effective antenna pattern results because the invention involves the comparison of echoes for various polarizations and a different antenna pattern usually exists for each polarization. For example, if the antenna for one polarization has a very narrow main lobe and if for the other polarization the antenna has very weak sidelobes, the resulting system pattern can be one with a very narrow main lobe and very weak sidelobes.

The embodiments of the present invention may be made with components that are well known to the radar art. For increased receiver dynamic range, logarithmic amplifiers can be used. Alternately, linear amplifiers can be used. Suitable comparators, integrators and displays are also available within the present state of the radar art.

The foregoing has been a description of illustrative embodiments of the invention. By applying the principles set forth above, along with the inventive concepts illustrated by the foregoing alternative embodiments, certain modifications of the disclosed method and apparatus will be obvious to those skilled in the art. Therefore, the scope of the present invention is limited solely by reference to the appended claims.

What is claimed is:

1. A radar clutter suppressor comprising:
   a first means for providing at least three different carrier frequencies;
   a second means for providing at least three received signals representing said carrier frequencies wherein for each one of said carrier frequencies there is a particular one of said received signals representing said one of said carrier frequencies;
   a third means for providing at least three video signals in response to said received signals, wherein for each one of said received signals there is a particular one of said video signals responsive to said one of said received signals;
   comparator means for comparing the magnitudes of said video signals, by pairs, and for providing an output only when the ratio of the magnitudes of each pair of at least two pairs of said received signals is a ratio within one of a plurality of predetermined ranges of ratios, and each of said plurality of predetermined ranges of ratios includes unity ratio;
   processing means responsive to said output for providing clutter suppressed radar output and for indicating the presence of a target in the presence of said output.

2. A radar clutter suppressor comprising:
   a first means for providing at least three different antenna beam pointing directions;
   a second means for providing at least three received signals representing said antenna beam pointing directions wherein for each one of said antenna beam pointing directions there is a particular one of said received signals representing said one of said antenna beam pointing directions;
   a third means for providing at least three video signals in response to said received signals, wherein for each one of said received signals there is a particular one of said video signals responsive to said one of said received signals;
   comparator means for comparing the magnitudes of said video signals, by pairs, and for providing an output only when the ratio of the magnitudes of each pair of at least two pairs of said received signals is a ratio within one of a plurality of predetermined ranges of ratios, and each of said plurality of predetermined ranges of ratios includes unity ratio;
   processing means responsive to said output for providing clutter suppressed radar output and for indicating the presence of a target in the presence of said output.

3. A radar clutter suppressor comprising:
   a first means for providing at least two different radar signal discriminants, wherein each of said radar signal discriminants has at least two different operative values;
   a second means for providing two received signals representing said operative values so that there is a different one of said operative values of each of said radar signal discriminants associated with each of said received signals;
   a third means for providing two video signals in response to said received signals, wherein said third means provides one of said video signals in response to each one of said received signals;
   comparator means for comparing the magnitude of said video signals and for providing an output only when the ratio of the magnitudes of said received signals is a ratio within a predetermined range of ratios, said range of ratios including unity; and processing means responsive to said output for providing clutter suppressed radar output and for indicating the presence of a target in the presence of said output.

4. A radar clutter suppressor as recited in claim 3 wherein said radar signal discriminants comprise received polarization and carrier frequency.

5. A radar clutter suppressor as recited in claim 3 wherein said radar signal discriminants comprise received polarization and antenna beam pointing direction.

6. A radar clutter suppressor as recited in claim 3 wherein said radar signal discriminants comprise received polarization and antenna beam width.

7. A radar clutter suppressor as recited in claim 3 wherein said radar signal discriminants comprise received polarization and transmit pulse length.

8. A radar clutter suppressor as recited in claim 3 wherein said radar signal discriminants comprise carrier frequency and antenna beam pointing direction.

9. A radar clutter suppressor as recited in claim 3 wherein said radar signal discriminants comprise carrier frequency and antenna beam width.

10. A radar clutter suppressor as recited in claim 3 wherein said radar signal discriminants comprise carrier frequency and transmit pulse length.

11. A radar clutter suppressor as recited in claim 3 wherein said radar signal discriminants comprise antenna beam pointing direction and antenna beam width.

12. A radar clutter suppressor as recited in claim 3 wherein said radar signal discriminants comprise antenna beam pointing direction and transmit pulse length.

13. A radar clutter suppressor as recited in claim 3 wherein said radar signal discriminants comprise antenna beam width and transmit pulse length.

14. A radar clutter suppressor comprising:
a first means for providing at least two different radar signal discriminants, wherein each of said radar signal discriminants has at least two different operative values;
a second means for providing at least three received signals representing said operative values wherein each of said received signals represents a different combination of said operative values of said discriminants;
a third means for providing at least three video signals in response to said signals, wherein for each one of said video signals there is one of said video signals responsive to each one of said received signals;
comparator means for comparing the magnitudes of said received video signals, by pairs, and for providing an output only when the ratio of the magnitudes of each pair of at least two pairs of said received signals is a ratio within one of a plurality of predetermined ranges of ratios, each of said plurality of predetermined ranges of ratios including unity ratio; and
processing means responsive to said output for providing clutter suppressed radar output and for indicating the presence of a target in the presence of said output.

15. A radar clutter suppressor as recited in claim 14 wherein said radar signal discriminants comprise received polarization and carrier frequency.

16. A radar clutter suppressor as recited in claim 14 wherein said radar signal discriminants comprise received polarization and antenna beam pointing direction.

17. A radar clutter suppressor as recited in claim 14 wherein said radar signal discriminants comprise received polarization and transmit pulse length.

18. A radar clutter suppressor as recited in claim 14 wherein said radar signal discriminants comprise carrier frequency and antenna beam pointing direction.

19. A radar clutter suppressor as recited in claim 14 wherein said radar signal discriminants comprise carrier frequency and transmit pulse length.

20. A radar clutter suppressor as recited in claim 14 wherein said radar signal discriminants comprise beam pointing direction and transmit pulse length.

21. A radar clutter suppressor as recited in claim 14 wherein said radar signal discriminants comprise antenna beamwidth and received polarization.

22. A radar clutter suppressor as recited in claim 14 wherein said radar signal discriminants comprise antenna beamwidth and carrier frequency.

23. A radar clutter suppressor as recited in claim 14 wherein said radar signal discriminants comprise antenna beamwidth and antenna beam pointing direction.

24. A radar clutter suppressor as recited in claim 14 wherein said radar signal discriminants comprise antenna beamwidth and transmit pulse length.

25. A radar clutter suppressor as recited in claims 1, 2, or 14 wherein said predetermined range of ratios includes, for at least one pair of said received signals, the value of the ratio of the power averages due to clutter for said pair of received signals.

26. A radar clutter suppressor as recited in claims 1, 2, or 14 wherein each of said plurality of predetermined ranges of ratios has both a finite lower limit greater than zero and a finite upper limit.

27. A radar clutter suppressor comprising:
a first means for generating pulsed waves;
a second means for transmitting a first polarization and a second polarization different from said first polarization;
a third means for receiving pulsed-wave echoes of said first polarization and said second polarization;
a fourth means for providing received signals in response to said pulsed wave echoes of said first polarization and said second polarization, said received signals comprising a first received signal representing said first polarization and a second received signal representing said second polarization;
a fifth means for providing a first video signal in response to said first received signal and a second video signal in response to said second received signal;
a comparator means for comparing the magnitudes of said first and second video signals and providing an output only when the ratio of the magnitudes of said first and second received signals is within a predetermined range of ratios, said range of ratios including unity ratio;
a processing means responsive too said output for providing clutter suppressed radar output and for indicating the presence of a target in the presence of said output.

28. A radar clutter suppressor as recited in claim 27 wherein
said first polarization is horizontal and said second polarization is vertical.

29. A radar clutter suppressor comprising:
a transmitter for generating radar waves;
an antenna comprising a first antenna means for providing a first antenna polarization and a second antenna means for providing a second antenna polarization, said first antenna polarization and said second antenna polarization being different;
transmission means for connecting said first antenna means and said transmitter and for transmitting radar waves of said first antenna polarization;
means for providing return signals from said first antenna means and from said second antenna means;
combining means comprising a hybrid junction and means for setting the relative phase between said return signals from said first antenna means and said return signals from said second antenna means for combining said return signals from said first antenna means and said return signals from said second antenna means to provide a first received signal of horizontal polarization and a second received signal of vertical polarization;
means for providing a first video signal in response to said first received signal;
means for providing a second video signal in response to said second received signal;
a comparator means for comparing the magnitudes of said first video signal and said second video signal and for providing an output only when the ratio of the magnitudes of said first received signal to said second received signal is within a predetermined range of ratios; and
processing means responsive to said output for providing clutter suppressed radar output.

30. A radar clutter suppressor as recited in claim 29 wherein said predetermined range of ratios includes unity ratio.

31. A radar clutter suppressor as recited in claim 29 wherein one of said first and said second antenna polarizations is right circular and the other of said first and said second antenna polarizations is left circular.

32. A radar clutter suppressor comprising:
a first means for providing a first antenna beam pointing direction and a second antenna beam pointing direction comprising a first antenna and a second antenna, said first antenna and said second antenna having approximately equal main beam characteristics and being pointed in different directions;
a second means for providing a first received signal from said first antenna representing said first antenna beam pointing direction and a second received signal from said second antenna representing said second antenna beam pointing direction;
a third means for providing a first video signal in response to said first received signal and a second video signal in response to said second received signal;
a comparator means for comparing the magnitudes of said video signals and for providing an output only when the ratio of the magnitudes of said first received signal and said second received signal is within a predetermined range of ratios, said predetermined range of ratios having both a finite lower limit greater than zero and less than unity and a finite upper limit greater than unity; and
a processing means responsive to said output for providing clutter suppressed radar output and for indicating the presence of a target in the presence of said output.

33. A radar clutter suppressor comprising:
a first means for providing at least two different carrier frequencies;
a second means for providing a first received signal representing a first one of said carrier frequencies and a second receive signal representing a second one of said carrier frequencies;
a third means for providing a first video signal responsive to said first received signal and a second video signal responsive to said second received signal;
a comparator means for comparing the magnitudes of said received video signals and providing an output only when the ratio of the magnitudes of said first received signal and said second received signal is within a predetermined range of ratios, said predetermined range of ratios having both a finite lower limit greater than zero and a finite upper limit and including the ratio of average power due to clutter of said first received signal to average power due to clutter of said second received signal; and
a processing means responsive to said output for providing clutter suppressed radar output and for indicating the presence of a target in the presence of said output.

34. A radar clutter suppressor as recited in claim 33 wherein said predetermined range of ratios includes unity ratio.

35. A radar clutter suppressor as recited in claims 3, 27, or 32, wherein said predetermined range of ratios includes the value of the ratio of the power averages due to clutter of said received signals.

36. A radar clutter suppressor as recited in claims 3, 27, 29, 32 or 33, wherein said comparator means comprises a first gate means for providing a gate signal only when said ratio of magnitudes of said first received signal to said second received signal exceeds a first predetermined ratio value and a second gate means for providing said output only when said ratio of magnitudes of said first received signal to said second received signal is less than a second predetermined ratio value and said first gate means provides said gate signal.

37. A radar clutter suppressor as recited in claims 1, 2, 3, 14, 27, 32 or 33 wherein said output is the only signal which is applied to said processing means which is dependent on the magnitude of any of said received signals.

* * * * *

UNITED STATES PATENT OFFICE
CERTIFICATE OF CORRECTION

Patent No. 4,231,037  Dated October 28, 1980

Inventor(s) MAURICE W. LONG

It is certified that error appears in the above-identified patent and that said Letters Patent are hereby corrected as shown below:

Col. 1, line 46, change "an" to --and--.
Col. 2, line 16, change "present" to --preset--.
Col. 2, line 21, change "rats" to --rates--.
Col. 4, line 53, change "comparaor" to --comparator--.
Col. 5, line 41, change "$\sigma$" to --$\overline{\sigma_{vv}}$--.
Col. 5, line 42, change "$\overline{\sigma_{RH}} > \overline{\sigma_{LH}}$" to --$\overline{\sigma_{RH}} = \overline{\sigma_{LH}}$--.
Col. 7, line 6, change "relative" to --receive--.
Col. 7, line 32, change "lest" to --least--.
Col. 10, line 63, change "storing" to --strong--.
Col. 12, line 60, change "divded" to --divided--.
Col. 13, line 38, change "5mm" to --5m--.

Claims

Claim 3, col. 18, line 67, change "magnitude" to --magnitudes--.

Claim 27, col. 20, line 65, change "too" to --to--.

Signed and Sealed this

Twenty-ninth Day of May 1984

[SEAL]

Attest:

GERALD J. MOSSINGHOFF

Attesting Officer    Commissioner of Patents and Trademarks